(12) United States Patent
Zhi et al.

(10) Patent No.: US 8,848,532 B2
(45) Date of Patent: Sep. 30, 2014

(54) METHOD AND SYSTEM FOR PROCESSING DATA

(75) Inventors: Lingyun Zhi, Shenzhen (CN); Linhan Li, Shenzhen (CN); Fei Song, Shenzhen (CN); Zuolin Ning, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 179 days.

(21) Appl. No.: 13/087,933

(22) Filed: Apr. 15, 2011

(65) Prior Publication Data

US 2011/0255543 A1 Oct. 20, 2011

(30) Foreign Application Priority Data

Apr. 15, 2010 (CN) .......................... 2010 1 0150286

(51) Int. Cl.
- *H04L 12/26* (2006.01)
- *H04L 12/28* (2006.01)
- *H04L 12/54* (2013.01)
- *G06F 3/00* (2006.01)
- *G06F 5/00* (2006.01)
- *G06F 15/173* (2006.01)

(52) U.S. Cl.
CPC .............................. *G06F 15/17325* (2013.01)
USPC . 370/235; 370/394; 370/395.21; 370/395.41; 370/395.42; 370/412; 370/429; 710/36; 710/52; 710/58

(58) Field of Classification Search
USPC ................... 370/394, 389, 412, 235, 395.21, 370/395.41, 395.42, 429; 709/232, 211; 710/36, 52, 58
See application file for complete search history.

(56) References Cited

U.S. PATENT DOCUMENTS

| | | | |
|---|---|---|---|
| 5,740,461 | A | 4/1998 | Jaggar |
| 6,226,687 | B1 * | 5/2001 | Harriman et al. ............. 709/246 |
| 7,990,974 | B1 * | 8/2011 | Gmuender et al. ........... 370/392 |

(Continued)

FOREIGN PATENT DOCUMENTS

| | | |
|---|---|---|
| CN | 1395168 A | 2/2003 |
| CN | 101036117 A | 9/2007 |

(Continued)

OTHER PUBLICATIONS

Combined Searcg and Examination Report dated Aug. 12, 2011 in connection with United Kingdom Patent Application No. GB1106392.2.

(Continued)

*Primary Examiner* — Alpus H Hsu
*Assistant Examiner* — Anthony Luo

(57) ABSTRACT

A data processing method and system and relevant devices are provided to improve the processing efficiency of cores. The method includes: storing received packets in a same stream sequentially; receiving a Get_packet command sent by each core; selecting, according to a preset scheduling rule, packets for being processed by each core among the stored packets; receiving a tag switching command sent by each core, where the tag switching command indicates that the core has finished a current processing stage; and performing tag switching for the packets in First In First Out (FIFO) order, and allocating the packets to a subsequent core according to the Get_packet command sent by the subsequent core after completion of the tag switching, so that the packet processing continues until all processing stages are finished. A data processing system and relevant devices are provided. With the present invention, the processing efficiency of cores may be improved.

10 Claims, 8 Drawing Sheets

(56) References Cited

U.S. PATENT DOCUMENTS

| | | | |
|---|---|---|---|
| 8,018,961 B2 * | 9/2011 | Gopinath et al. | 370/413 |
| 8,094,560 B2 * | 1/2012 | Bagepalli et al. | 370/235 |
| 2002/0078196 A1 * | 6/2002 | Kim et al. | 709/224 |
| 2003/0126185 A1 | 7/2003 | Itoh et al. | |
| 2004/0139441 A1 | 7/2004 | Kaburaki et al. | |
| 2005/0210325 A1 | 9/2005 | Douady et al. | |
| 2006/0010308 A1 | 1/2006 | Haruki et al. | |
| 2006/0056406 A1 * | 3/2006 | Bouchard et al. | 370/389 |
| 2006/0059310 A1 | 3/2006 | Asher et al. | |
| 2012/0216012 A1 * | 8/2012 | Vorbach et al. | 712/11 |

FOREIGN PATENT DOCUMENTS

| | | |
|---|---|---|
| CN | 101069170 A | 11/2007 |
| CN | 101447931 A | 6/2009 |
| JP | 2006023902 A | 1/2006 |
| WO | WO 2006/031459 A1 | 3/2006 |

OTHER PUBLICATIONS

Jian-Ming Yu, et al., "Maintaining packet order in network processor-based application", Computer Engineering and Applications, 2007, 43(33), p. 147-149.
Examination Report dated Mar. 27, 2012 in connection with United Kingdom Patent Application No. GB1106392.2.
Examination Report dated Dec. 6, 2012 in connection with United Kingdom Patent Application No. GB1106392.2.
Office Action dated Aug. 23, 2013 in connection with Chinese Patent Application No. 201010150286.3.
Examination Report under Section 18(3) dated Jul. 26, 2013 in connection with United Kingdom Patent Application No. GB1106392.2.
Search Report dated Jul. 22, 2013 in connection with Chinese Patent Application No. 201010150286.3.

* cited by examiner

METHOD AND SYSTEM FOR PROCESSING DATA

CROSS-REFERENCE TO RELATED APPLICATION

This application claims priority to Chinese Patent Application No. 201010150286.3, filed on Apr. 15, 2010, which is hereby incorporated by reference in its entirety.

TECHNICAL FIELD

The present invention relates to data processing, and in particular, to a data processing method and system and relevant devices.

BACKGROUND

Nowadays, communication networks are more and more complicated, and new services are emerging constantly, which imposes higher requirements on the capability of controlling network traffic and network security. As the core of a network system, the communication processor encounters great challenges. To meet the high-bandwidth requirement, a Multi-Core Processor emerges.

The Multi-Core Processor is challenged by many technical difficulties in the communication process. One of the difficulties is to enforce order of packets, Multiple cores process various packets parallelly. For the packets in a same stream, each core needs to distribute the packets in First In First Out (FIFO) order. Generally, the delays of processing packets by the cores are different. Consequently, the processing of a packet that arrives earlier may be completed later, and the processing of a packet that arrives later may be completed earlier, which will disorder the packets and affect the service streams.

One processing mode applied in the communication process of a Multi-Core Processor is the pipeline mode. In the pipeline mode, one packet is processed by multiple cores jointly, each core is responsible for a specific stage of the packet processing, and finally, a processing result is output. Because packets in one stream are processed in multiple stages before the processing result is output, the original order of the packets needs to be kept when the packet processing switches from the egress of a processing stage to the ingress of the next processing stage.

In the pipeline mode in the prior art, the order of packets is enforced in the following way:

As shown in FIG. 1, a Critical Section Round Robin (CSRR) mode is applied in the prior art. The cores perform the reading operation, processing operation and writing operation for a packet sequentially. If core 0 has not finished the writing operation but core 1 has finished the processing operation, core 1 has to wait; and the subsequent cores have to wait so that the output packets can be kept in order.

In the prior art, a core may spend much time in waiting for completion of the operation of the previous core, which deteriorates the processing efficiency of cores.

SUMMARY

Embodiments of the present invention provide a data processing method, a data processing system, and relevant devices to improve efficiency of cores.

According to the first aspect of the present invention, a data processing method includes: storing received packets in a same stream sequentially; receiving a Get_packet command sent by each core; selecting, according to a preset scheduling rule, packets for being processed by each core among the stored packets; receiving a tag switching command sent by each core, where the tag switching command indicates that the core has finished a current processing stage; performing tag switching for the processed packets in FIFO order, and submitting the processed packets to a subsequent core according to the Get_packet command sent by the subsequent core after completion of the tag switching, so that the packet processing continues until all processing stages are finished.

According to the second aspect of the present invention, a data processing method includes: sending a Get_packet command to a POE module; obtaining corresponding packets from a packet buffer address returned by the POE module and processing the packets; and sending a tag switching command to the POE module and executing other service procedures after completion of processing the packets, where the tag switching command indicates that the core has finished a current processing stage.

According to the third aspect of the present invention, a POE module includes: a storing unit, configured to store received packets in a same stream sequentially; a Get_packet command receiving unit, configured to receive a Get_packet command sent by each core; a distributing unit, configured to select, according to a preset scheduling rule, packets for being processed by each core among the stored packets; a switching command receiving unit, configured to receive a tag switching command sent by each core, where the tag switching command indicates that the core has finished a current processing stage; a tag switching unit, configured to perform tag switching for the processed packets in FIFO order; and a processing unit, configured to submit the processed packets to a subsequent core according to the Get_packet command sent by the subsequent core after completion of the tag switching, so that the packet processing continues until all processing stages are finished.

According to the fourth aspect of the present invention, a core includes: a Get_packet command sending unit, configured to send a Get_packet command to a POE module; a packet processing unit, configured to obtain corresponding packets from a packet buffer address returned by the POE module and process the packets; a switching command sending unit, configured to send a tag switching command to the POE module after completion of processing the packets, where the tag switching command indicates that the core has finished a current processing stage; and a service executing unit, configured to execute other service procedures while the switching command sending unit sends the tag switching command.

According to the fifth aspect of the present invention, a data processing system includes a POE module and cores.

The embodiments of the present invention bring at least the following benefits:

In the embodiments of the present invention, the POE module receives a tag switching command from the core after the core completes the processing of the packets, and therefore, the POE module can perform tag switching for the packets in the FIFO order, and keep order of the packets. Meanwhile, the core only needs to execute the operations such as Get_packet, processing, and sending of the tag switching command. After the core sends the tag switching command, the subsequent operations are undertaken by the POE module. The core can continue executing other service procedures without waiting for the processing result of other cores, thus reducing the waiting time and improving efficiency of the cores.

DETAILED DESCRIPTION

The embodiments of the present invention provide a data processing method, a data processing system, and relevant devices to improve efficiency of cores.

Figure 1:
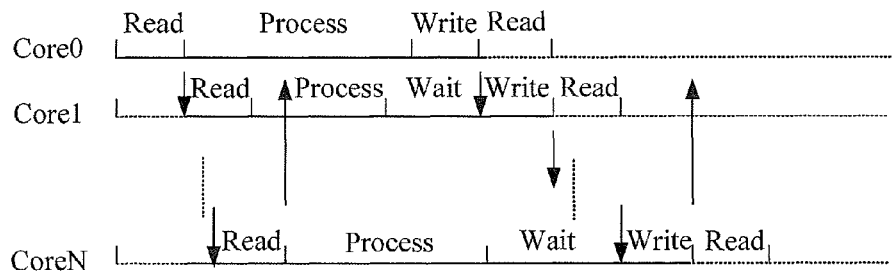
FIG. 1 illustrates a packet order enforcing method in the prior art.
Figure 2:
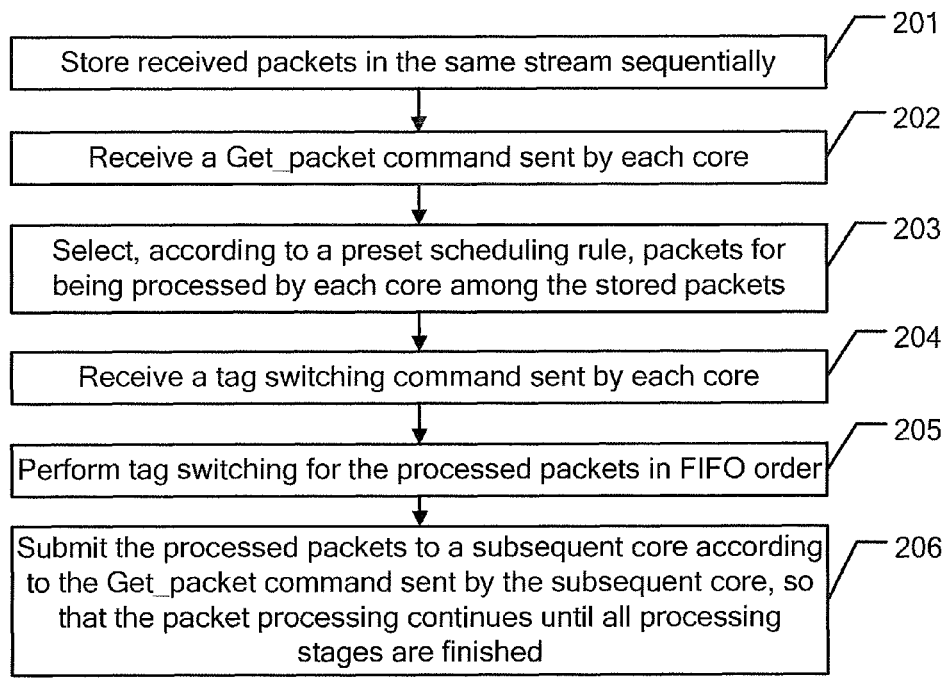
FIG. 2 is a schematic diagram showing a data processing method according to an embodiment of the present invention.

As shown in FIG. 2, a data processing method according to an embodiment of the present invention includes the following blocks:

201. Store the received packets in the same stream sequentially.

In this embodiment, the POE module stores the packets in the same stream sequentially, and specifically, stores the descriptor information of each packet.

Figure 3:
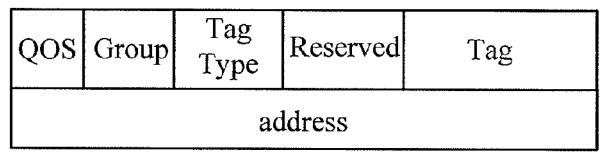
FIG. 3 is a schematic diagram showing a packet storage format of a POE module according to an embodiment of the present invention.

As shown in FIG. 3, the descriptor information of a packet in this embodiment includes:

Quality of Service (QoS): indicates QoS of the packet;

Group: indicates the processing stage of the packet and the cores that can process the packet;

Tag Type: indicates the tag type of the packet;

Tag: indicates the tag of the packet; and

Address: indicates the address for storing the packet in the memory.

202. Receive a Get_packet command sent by each core.

When a core requests to get a packet for processing, the core sends a Get_packet command to the POE module, requesting the POE module to allocate a packet for processing.

203. Select, according to a preset scheduling rule, a packet for being processed by each core among the stored packets.

After receiving the Get_packet command from each core, the POE module selects, according to a preset scheduling rule, a packet for each core among the stored packets, and specifically, selects the corresponding packet according to Strict Priority (SP) scheduling or Weighted Round Robin (WRR).

204. Receive a tag switching command sent by each core.

After the POE module allocates a packet to each core and a core finishes processing the allocated packet, the core sends a tag switching command to the POE module. The tag switching command indicates that the core has finished the current processing stage.

The POE module receives tag switching commands from the cores successively.

205. Perform tag switching for the processed packets in FIFO order.

According to the received tag switching command, the POE module performs tag switching for the packets processed by the cores in the FIFO order so that the packets can be further processed by subsequent cores. The detailed tag switching process will be described herein later.

206. Allocate the processed packets to a subsequent core according to the Get_packet command sent by the subsequent core, so that the packet processing continues until all processing stages are finished.

In this embodiment, the packets are processed in the pipeline mode. That is, the packets need to be processed by a series of cores before all the processing stages are finished. Therefore, after completion of tag switching, the POE module may allocate the processed packets again according to the Get_packet command of the subsequent core until all processing stages are finished.

In this embodiment, the POE module receives a tag switching command from the core after the core completes the processing of the packets, and therefore, the POE module can perform tag switching for the packets in the FIFO order, and keep the order of the packets. Meanwhile, the core only needs to execute the operations such as Get_packet, processing, and sending of the tag switching command. After the core sends the tag switching command, the subsequent operations are undertaken by the POE module. The core can continue executing other service procedures without waiting for the processing result of other cores, thus reducing the waiting time and improving efficiency of the cores.

Figure 4:
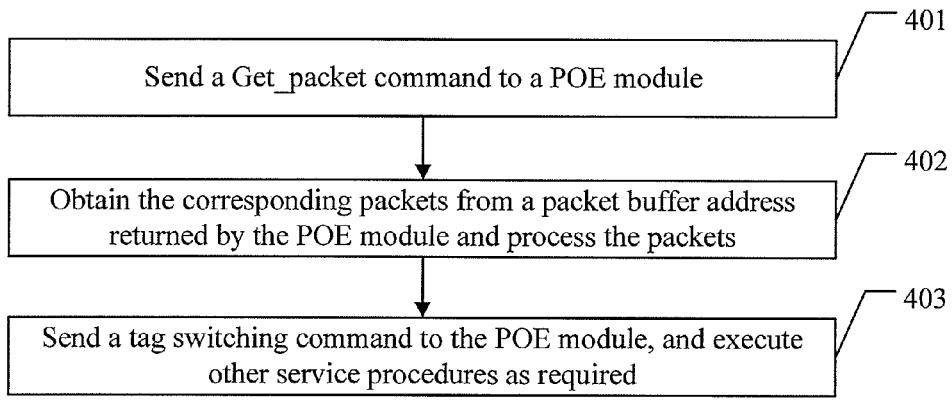
FIG. 4 is a schematic diagram showing a data processing method according to another embodiment of the present invention.

The data processing method in the present invention is described from the perspective of the POE module above. The following describes the data processing method from the perspective of a core. As shown in FIG. 4, a data processing method in another embodiment of the present invention includes the following blocks:

401. Send a Get_packet command to the POE module.

When a core needs to get a packet for processing, the core sends a Get_packet command to the POE module, requesting the POE to allocate a packet for processing.

402. Obtain the corresponding packets from a packet buffer address returned by the POE module and process the packets.

After sending the Get_packet command, the core receives a packet buffer address from the POE module, and then gets the corresponding packet according to the buffer address and processes the packet. The detailed processing is well known to persons skilled in the art.

403. Send a tag switching command to the POE module, and execute other service procedures as required.

After the core finishes processing a packet, the core sends a tag switching command to the POE module and executes other service procedures. The tag switching command indicates that the core has finished the current processing stage.

In this embodiment, the core only needs to execute the operations such as Get_packet, processing, and sending of the tag switching command. After the core sends the tag switching command, the subsequent operations are undertaken by the POE module. The core can continue executing other service procedures without waiting for the processing result of other cores, thus reducing the waiting time and improving efficiency of the cores.

Figure 5:
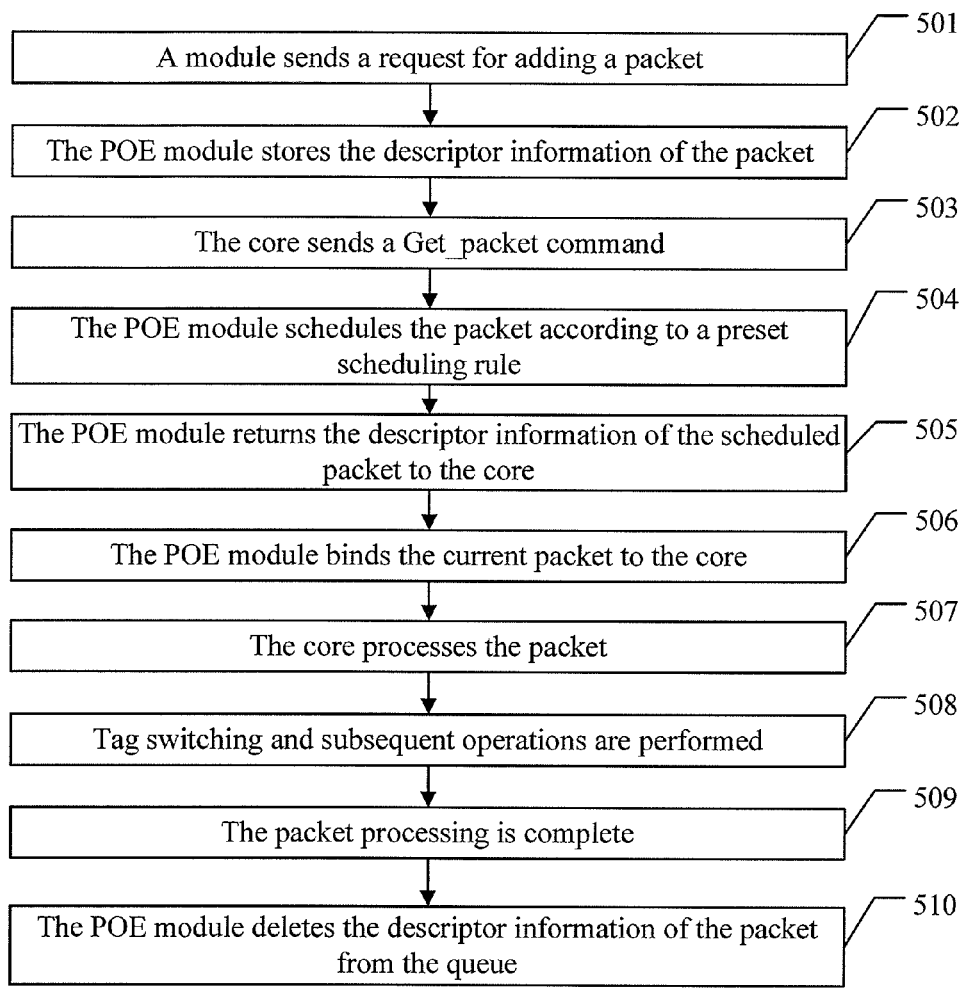
FIG. 5 is a schematic diagram showing a procedure of processing a single packet according to an embodiment of the present invention.

Taking a single packet as an example, the following describes the data processing method in more detail. As shown in FIG. 5, the procedure of processing a single packet according to an embodiment of the present invention includes the following blocks:

501. A module sends a request for adding a packet.

In this embodiment, the modules such as GMAC, Core, Tring, and IPSEC send an Add_packet command, requesting to add a packet to the POE module. The POE module resolves the command.

502. The POE module stores the descriptor information of the packet.

After receiving the Add_packet command, the POE module stores the descriptor information of the packet in the corresponding format. The detailed format is shown in FIG. 2.

503. The core sends a Get_packet command.

When a core needs to get a packet for processing, the core sends a Get_packet command to the POE module, requesting the POE module to allocate a packet for processing.

504. The POE module schedules the packet according to a preset scheduling rule.

After receiving the Get_packet command from the core, the POE module schedules the packet according to the preset scheduling rule. Specifically, the POE module performs SP scheduling or WRR scheduling according to the QoS, selects a QoS queue first; and then determines, according to the group mask register of the core, the groups of packets that can be processed by the core, selects a group queue, and selects a packet from the group queue.

505. The POE module returns the descriptor information of the scheduled packet to the core.

After determining the packet allocated to the core, the POE module returns the descriptor information of the scheduled packet to the core through AHB slave. The descriptor information is the buffer address of the packet.

506. The POE module binds the current packet to the core.

After returning the descriptor information of the scheduled packet to the core, the POE module binds the packet to the core. By then, a packet is bound to a core.

507. The core processes the packet.

After the current packet is bound to the core, the core may process the packet. The detailed processing is well known to persons skilled in the art.

508. Tag switching and subsequent operations are performed.

In this embodiment, a packet undergoes multiple processing stages. In the POE module, the interworking between the stages is implemented by tag switching.

After finishing the current processing stage of the packet, the core may send a tag switching command, requesting the POE module to switch the packet bound to the core from the current group queue to a new group queue. In the tag switching process, the tag type and the tag may be updated. In this way, the packet can be processed by other cores in subsequent stages.

It should be noted that, the tag switching operation is primarily performed by the POE module so that the processing capabilities of the core can be fully exerted. The core can execute other tasks while the POE module performs tag switching.

The POE module may provide a tag switching state bit, which indicates the completion state of the tag switching operation. The core may send a Get_state command to query the state. It is understandable that the POE module may write this state into the buffer space of the core, which prevents the bus interface from being queried frequently, and improves the processing efficiency.

If the tag switching state bit shows that the tag switching is complete, the core may send a Get_packet command to the POE module to continue subsequent processing.

509. The packet processing is complete.

If determining that the processing of the current packet is complete, the core sends a special SWITCH_NULL command, indicating that the packet has undergone all processing stages and is ready for outputting.

510. The POE module deletes the descriptor information of the packet from the queue.

After receiving the SWITCH_NULL command from the core, the POE module knows that the packet has undergone all processing stages. Therefore, the POE module deletes the finished packet from the local tag queue.

In this embodiment, the POE module receives a tag switching command from the core after the core completes the processing of the packet, and therefore, the POE module can perform tag switching for the packet in the FIFO order, and keep the order of packets. Meanwhile, the core only needs to execute the operations such as Get_packet, processing, and sending of the tag switching command. After the core sends the tag switching command, the subsequent operations are undertaken by the POE module. The core can continue executing other service procedures without waiting for the processing result of other cores, thus reducing the waiting time and improving efficiency of the cores.

Besides, the POE module may write the tag switching state flag into the buffer space of the core, which prevents the bus interface from being queried frequently and improves the processing efficiency.

Figure 6:
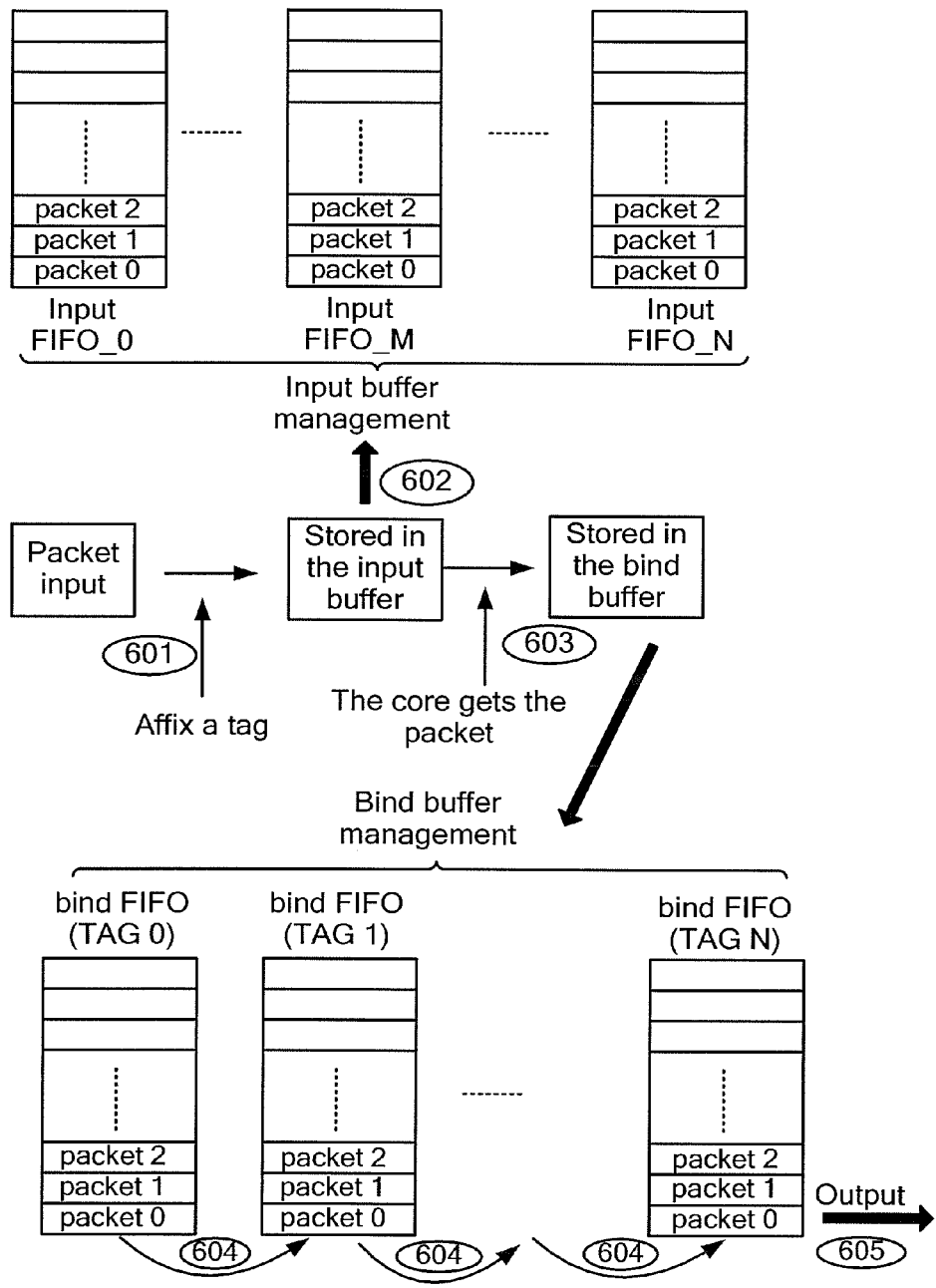
FIG. 6 is a schematic diagram showing a packet order enforcing process according to an embodiment of the present invention.

The processing of a single packet is described above. The following describes a packet order enforcing process. As shown in FIG. 6, a packet order enforcing process in an embodiment of the present invention includes the following steps:

601. The POE module affixes tags to packets.

In this embodiment, the POE module may sort and resolve the input packets, affix tags to different streams respectively, and use "tag+tag type" to differentiate streams.

QoS information needs to be affixed to the packets corresponding to specific QoS levels. If any packets can be processed by specified cores only, group information needs to be affixed to the packets to indicate the cores that can process the packets.

602. The POE module manages the packets.

According to the QoS+Group information, the POE module stores the packets into the input buffer by category, where each input FIFO queue corresponds to a unique "QoS+Group", namely, a unique stream.

603. The core gets a packet.

When the core needs to get a packet for processing, the core sends a Get_packet command. The POE module resolves the command, and allocates, according to the QoS information and group information, a packet compliant with the conditions from the input buffer, and sends the packet to the core. Meanwhile, the POE module records the tag of each packet in the bind buffer, and manages the packets based on the tags solely.

604. Tag switching process.

In the bind buffer, tag switching is performed for the packet in a FIFO queue so that the packet is processed by another core after being processed by one core.

605. Packet output process.

After the packet undergoes all processing stages, the core sends a Finish command. After receiving this command, the POE module deletes the packet from the hind buffer.

Figure 7:
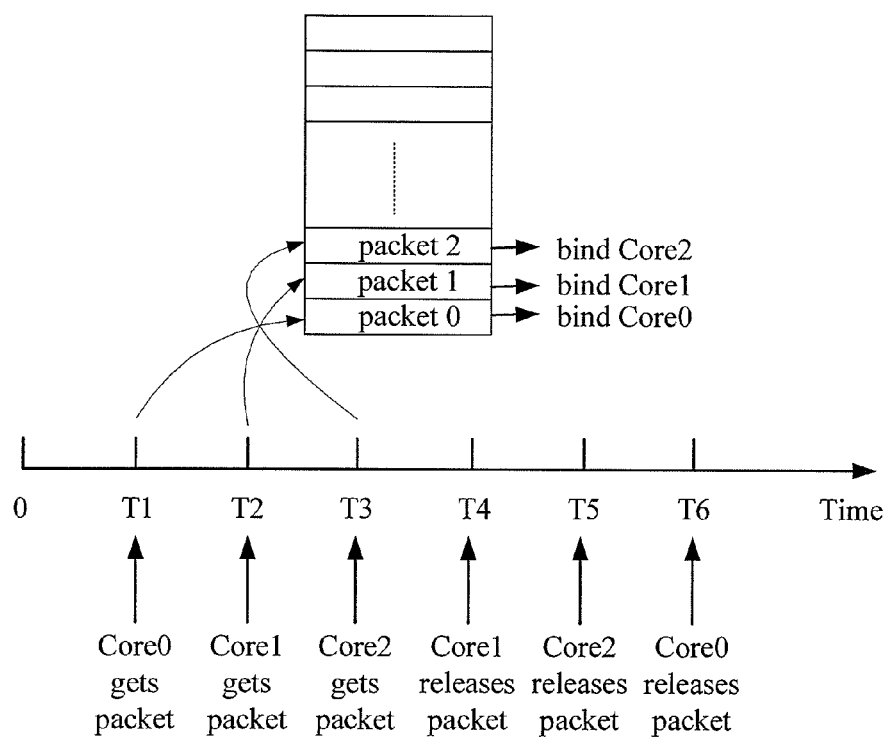
FIG. 7 is a schematic diagram showing a packet order enforcing process according to another embodiment of the present invention.

It should be noted that, based on the foregoing packet order enforcing process, when multiple cores get packets in a FIFO queue, the FIFO rule needs to be applied, as shown in FIG. 7. The following describes the packet processing.

At time T1, Core0 gets Packet0, and begins processing Packet0.

At time T2, Core1 gets Packet1, and begins processing Packet1.

At time T3, Core2 gets Packet2, and begins processing Packet2.

Because the processing performances of different cores differ, the order of finishing the processing differs.

At time T4, Core1 finishes the processing first, and sends a tag switching command to the POE module; because the packet bound to Core1 is not at the head of the queue at this time, the packet is not output from the bind FIFO queue immediately.

At time T5, Core2 finishes the processing, and sends a tag switching command to the POE module; because the packet bound to Core2 is not at the head of the queue at this time, the packet is not output from the bind FIFO queue immediately.

At time T6, Core0 finishes the processing, and sends a tag switching command to the POE module; because the packet bound to Core0 is located at the head of the queue at this time, the POE module can perform tag switching in the FIFO order, and therefore, Packet0 is output from the bind FIFO queue directly to undergo the next stage of processing, and then Packet1 and Packet2 are output from the queue successively.

In this embodiment, through the FIFO management, the input and output of packets are based on a FIFO rule in each stage of processing, and the order of the packets is maintained. Meanwhile, the core can continue executing other service procedures after sending the Get_packet command and the Finish command, thus improving the processing efficiency of the core.

The foregoing embodiment deals with the data processing method based on tag switching, and this method enables packet processing between cores. In practice, to reduce the waiting delay involved in the packet processing, a Finish flag bit may be set and managed in the corresponding level-2 buffer. The detailed solution is shown in FIG. 8.

Figure 8:
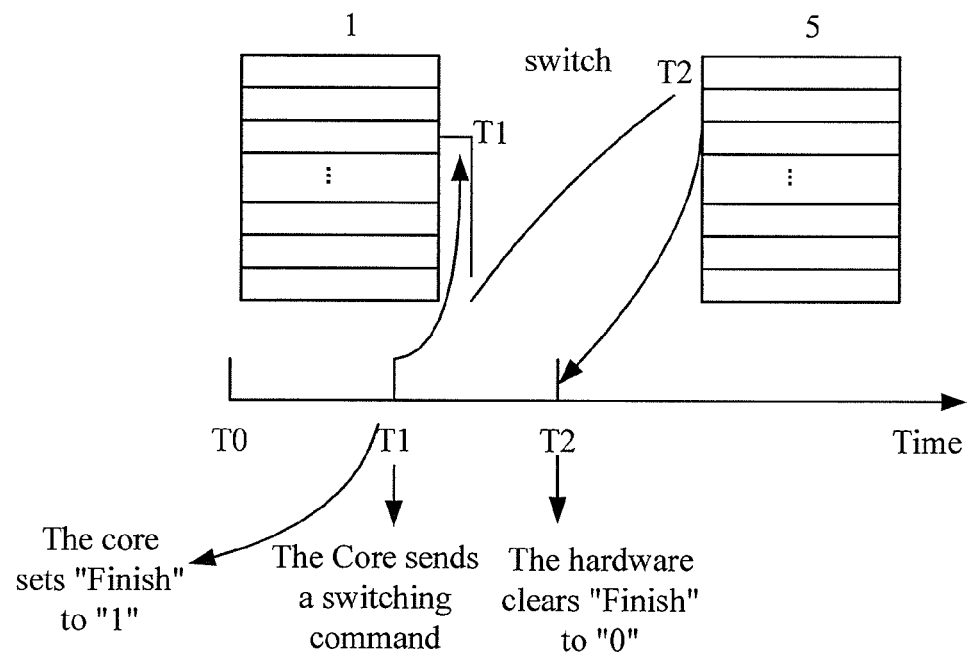
FIG. 8 is a schematic diagram showing flag bit processing according to an embodiment of the present invention.

In FIG. 8, a packet in queue 1 needs to be switched to queue 5; this packet is not located at the head of the bind FIFO queue; the packet cannot be output from this queue if the processing of the previous packet is not finished; after the processing of the previous packet is finished, the previous packet may need to be switched to the same tag queue, and therefore, the packet order enforcing function is impossible once a subsequent packet is output from the queue first.

The packet can be output from the queue only if the packet moves to the head of the queue, and the packet is switched to a new queue to undergo the next queuing process.

At time T1, when the core needs to execute a switching process, the core sets its Finish tag in the level-2 buffer to "1", and sends a switching command. Afterward, the core checks whether the Finish flag bit in the level-2 buffer is "0", and continues processing the packet only if the Finish flag bit is "0", or executes other service procedures if the Finish flag bit is not "0".

At time T2, after detecting the switching command sent by the core, the POE module transfers the packet bound to the core from bind FIFO1 to bind FIFO5 (namely, waits for the packet to arrive at the head of the bind FIFO1 queue, and then switches the packet to the tail of the bind FIFO5 queue). Upon completion of the switching process, the POE module clears the corresponding Finish flag bit of the core in the level-2 buffer to 0.

At this time, if the core detects that the Finish flag bit is 0, the core may continue processing the packet; if the Finish flag bit is not 0, the core may execute other service procedures, thus making full use of the capabilities of the core.

Figure 9:
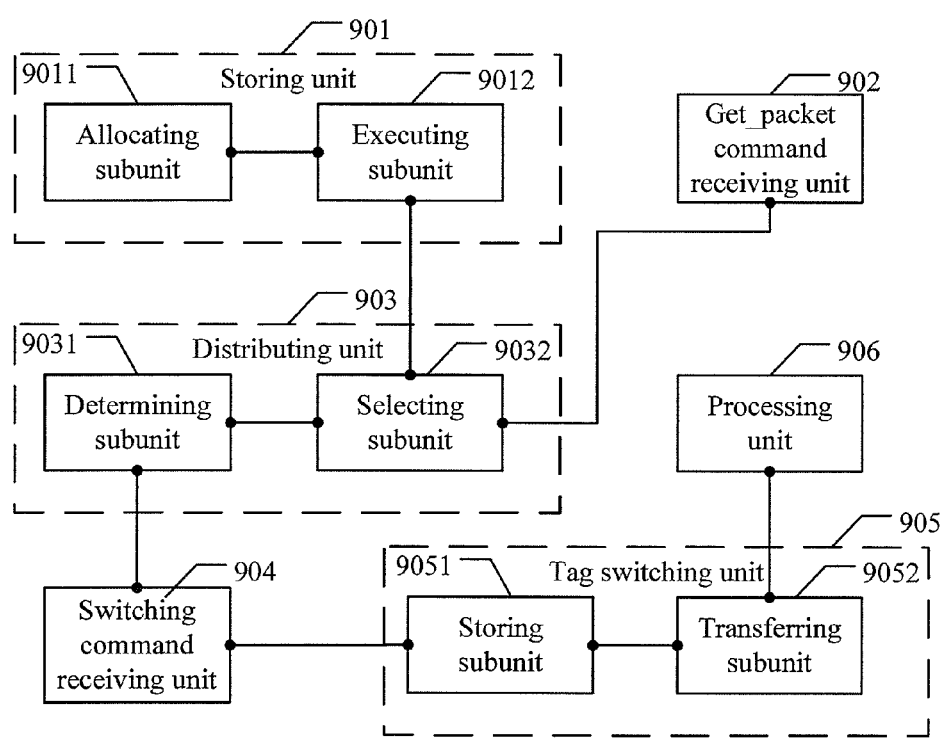
FIG. 9 is a schematic diagram showing a POE module according to an embodiment of the present invention.

The following describes a POE module. As shown in FIG. 9, a POE module provided in an embodiment of the present invention includes:

a storing unit 901, configured to store received packets in the same stream sequentially;

a Get_packet command receiving unit 902, configured to receive a Get_packet command sent by each core;

a distributing unit 903, configured to select, according to a preset scheduling rule, a packet for being processed by each core among the stored packets;

a switching command receiving unit 904, configured to receive a tag switching command sent by each core, where the tag switching command indicates that the core has finished a current processing stage;

a tag switching unit 905, configured to perform tag switching for the processed packets in FIFO order; and a processing unit 906, configured to, after completion of the tag switching, allocate the processed packets to a subsequent core according to the Get_packet command sent by the subsequent core, so that the packet processing continues until all processing stages are finished.

The storing unit 901 in this embodiment includes:

an allocating subunit 9011, configured to allocate a group identifier and QoS information to each packet in the same stream; and an executing subunit 9012, configured to store the packets in an input FIFO queue according to the group identifier and QoS information.

The distributing unit 903 in this embodiment includes:

a selecting subunit 9031, configured to perform SP scheduling or WRR scheduling, according to the QoS information, to select a QoS queue; and a determining subunit 9032, configured to determine, according to a group identifier mask register of the core, the group queue that can be processed by the core, and select a packet for the core from the group queue.

The tag switching unit 905 in this embodiment includes:

a storing subunit 9051, configured to store the processed packets into a bind FIFO queue in the FIFO order; and a transferring subunit 9052, configured to transfer the packets in the bind FIFO queue from the current group queue to a new group queue, and update the tags of the processed packets.

The tag switching process performed by the tag switching unit 905 in this embodiment is the same as the tag switching process described in the embodiment shown in FIG. 5.

In this embodiment, the switching command receiving unit 904 receives a tag switching command from the core after the core completes the processing of a packet, and therefore, the tag switching unit 905 can perform tag switching for the packet in the FIFO order, and keep the order of packets. Meanwhile, the core only needs to execute the operations such as Get_packet, processing, and sending of the tag switching command. After the core sends the tag switching command, the subsequent operations are undertaken by the POE module. The core can continue executing other service procedures without waiting for the processing result of other cores, thus reducing the waiting time and improving efficiency of the cores.

Figure 10:
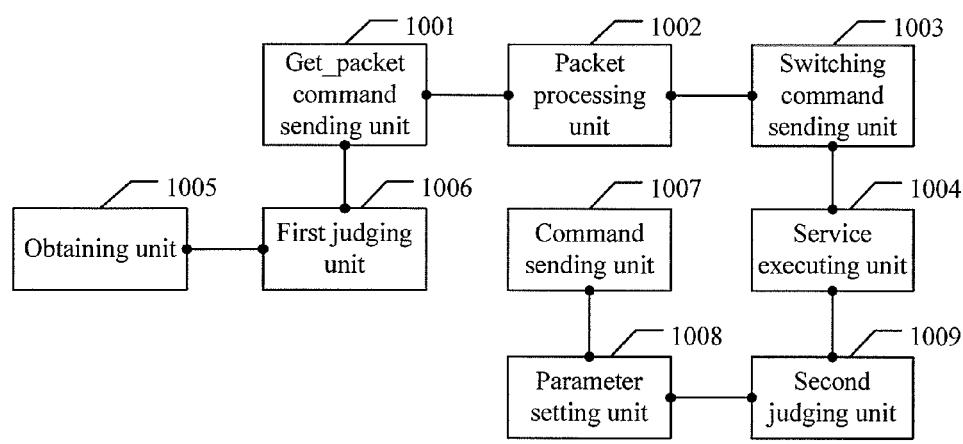
FIG. 10 is a schematic diagram showing a core according to an embodiment of the present invention.

The following describes a core. As shown in FIG. 10, a core provided in an embodiment of the present invention includes:

a Get_packet command sending unit 1001, configured to send a Get_packet command to a POE module;

a packet processing unit 1002, configured to obtain corresponding packets from a packet buffer address returned by the POE module and process the packets;

a switching command sending unit 1003, configured to send a tag switching command to the POE module after completion of processing the packets, where the tag switching command indicates that the core has finished a current processing stage; and a service executing unit 1004, configured to execute other service procedures while the switching command sending unit sends the tag switching command.

The core in this embodiment may further include:

an obtaining unit 1005, configured to obtain a tag switching state bit provided by the POE module, or obtain the tag switching state bit from a buffer space; and a first judging unit 1006, configured to judge whether the tag switching state bit indicates that the POE module has finished tag switching, and, if the tag switching state bit indicates that the POE module has finished tag switching, trigger the Get_packet command sending unit 1001 to execute the corresponding operation.

The core in this embodiment may further include:

a command sending unit 1007, configured to send a switching command to the POE module, where the switching command is an instruction of switching a packet to be processed from the first bind FIFO queue to the second bind FIFO queue;

a parameter setting unit 1008, configured to set a Finish flag bit in the level-2 buffer to a value which instructs the core not to process the packet for the moment; and a second judging unit 1009, configured to judge whether the Finish flag bit in the level-2 buffer indicates completion of switching, and, if the Finish flag bit in the level-2 buffer indicates completion of switching, trigger the service executing unit 1004 to continue processing the packet to be processed.

The process of interactions between the units in the core in this embodiment is the same as the processes in FIG. 4 and FIG. 5 above.

In this embodiment, the core only needs to execute the operations such as Get_packet, processing, and sending of the tag switching command. After the switching command sending unit 1003 sends the tag switching command, the subsequent operations are undertaken by the POE module. The core can continue executing other service procedures without waiting for the processing result of other cores, thus reducing the waiting time and improving efficiency of the cores.

A data processing system is provided in an embodiment of the present invention. The data processing system includes a POE module and several cores. The POE module is illustrated in FIG. 9 above, and the cores are shown in FIG. 10 above.

Persons of ordinary skill in the art should understand that all or part of the steps of the method in the embodiments of the present invention may be implemented by a program instructing relevant hardware. The program may be stored in a computer readable storage medium, and the storage medium may be a Read Only Memory (ROM), a magnetic disk, or a Compact Disk-Read Only Memory (CD-ROM).

Expounded above are data processing method and system and relevant devices under the present invention. Although the invention is described through some exemplary embodiments, the invention is not limited to such embodiments. It is apparent that those skilled in the art can make modifications and variations to the invention without departing from the spirit and scope of the invention. The invention is intended to cover the modifications and variations provided that they fall within the scope of protection defined by the following claims or their equivalents.

What is claimed is:

1. A method for processing data in a processor that includes multiple cores, the method comprising:
storing received packets in a same stream sequentially, comprising:
allocating a group identifier and Quality of Service (QoS) information to each packet in the same stream, and
storing, according to the group identifier and QoS information, the packets in an input FIFO queue;
receiving Get_packet commands sent by the cores;
selecting among the stored packets, according to a preset scheduling rule, packets for processing by each of the cores, comprising:
performing Strict Priority (SP) scheduling or Weighted Round Robin (WRR) scheduling, according to the QoS information, to select a QoS queue, and
determining, according to a group identifier mask register of a particular core, a group queue that can be processed by the particular core, and selecting a packet for the particular core from the group queue;
receiving tag switching commands sent by the cores, wherein each tag switching command indicates that a particular core has finished a current processing stage of a particular packet; and
for each packet for which a current processing stage has been finished by a corresponding core, performing tag switching in First In First Out (FIFO) order of the stored packets, to switch the packet to a subsequent processing stage performed by a subsequent core, wherein packets for which a current processing stage has finished are allocated to subsequent cores according to Get_packet commands sent by the subsequent cores after completion of their respective tag switching, so that the packet processing continues until all processing stages are finished, wherein performing tag switching in FIFO order comprises:
storing the packets into a bind FIFO queue in FIFO order;
transferring the packets in the bind FIFO queue from a current group queue to a new group queue; and
updating tags of the packets.

2. The method according to claim 1, further comprising:
providing each core with a tag switching state bit which indicates whether tag switching is finished;
or,
writing the tag switching state bit into a buffer space of a particular core, wherein the tag switching state bit indicates whether tag switching is finished for the particular core.

3. The method according to claim 1, wherein:
after allocating the processed packets to the subsequent cores according to the Get_packet commands sent by the subsequent cores so that the packet processing continues until all processing stages are finished, the method further comprises:
receiving a SWITCH_NULL command that indicates that a packet has undergone all processing stages; and
outputting the packet that has undergone all processing stages in the FIFO order, and deleting a tag of the packet that has undergone all processing stages.

4. The method according to claim 1, further comprising:
receiving a switching command sent by a particular core, wherein the switching command is an instruction for switching a packet for processing from a first bind FIFO queue to a second bind FIFO queue, and a Finish flag bit in a level-2 buffer of the particular core instructs the particular core not to process the packet for the moment;
switching the packet for processing from the first bind FIFO queue to the second bind FIFO queue in the FIFO order; and
modifying the value of the Finish flag bit in the level-2 buffer of the particular core so that the value indicates completion of switching and instructs the particular core to continue processing the packet.

5. A Packet Order Enforce (POE) module in a processor that includes multiple cores, the POE module comprising:
a storing unit, configured to store received packets in a same stream sequentially;
a Get_packet command receiving unit, configured to receive Get_packet commands sent by the cores;
a distributing unit, configured to select among the stored packets, according to a preset scheduling rule, packets for processing by the cores, wherein the distributing unit comprises:
a selecting subunit, configured to, according to QoS information, perform Strict Priority (SP) scheduling or Weighted Round Robin (WRR) scheduling to select a Quality of Service (QoS) information queue, and
a determining subunit, configured to determine, according to a group identifier mask register of a particular core, a group queue that can be processed by the particular core, and select a packet for the particular core from the group queue;
a switching command receiving unit, configured to receive tag switching commands sent by the cores, wherein each tag switching command indicates that a particular core has finished a current processing stage;
a tag switching unit, configured to perform tag switching for each packet for which a current processing stage has been finished by a corresponding current core, in First In First Out (FIFO) order of the stored packets, to switch the packet to a subsequent processing stage performed by a subsequent core; and
a processing unit, configured to allocate the processed packets for which a current processing stage has finished to subsequent cores according to the Get_packet commands sent by the subsequent cores after completion of the tag switching, so that the packet processing continues until all processing stages are finished,
wherein the tag switching unit comprises:
a storing subunit, configured to store packets into a bind First In First Out (FIFO) queue in FIFO order; and
a transferring subunit, configured to transfer the packets in the bind FIFO queue from a current group queue to a new group queue, and update tags of the packets.

6. The POE module according to claim 5, wherein the storing unit comprises:
an allocating subunit, configured to allocate a group identifier and Quality of Service (QoS) information to each packet in the same stream; and
an executing subunit, configured to store the packets in an input FIFO queue according to the group identifier and QoS information.

7. The POE module according to claim 5, wherein the POE module is further configured to provide each core with a tag switching state bit which indicates whether tag switching is finished, or write the tag switching state bit into a buffer space of a particular core, wherein the tag switching state bit indicates whether tag switching is finished for the particular core.

8. The POE module according to claim 5, wherein the POE module is further configured to receive a SWITCH_NULL command which indicates that a packet has undergone all processing stages, output the packet which has undergone all processing stages in the FIFO order, and delete a tag of the packet which has undergone all processing stages.

9. The POE module according to claim 5, wherein the POE module is further configured to receive a switching command sent by a particular core; switch the packet for processing from a first bind FIFO queue to a second bind FIFO queue in the FIFO order; and modify a value of a Finish flag bit in a level-2 buffer of the particular core so that the value indicates completion of switching and instructs the core to continue processing the packet; wherein the switching command is an instruction of switching a packet for processing from the first bind FIFO queue to the second bind FIFO queue, and the Finish flag bit in the level-2 buffer of the particular core instructs the particular core not to process the packet for the moment.

10. A data processing system, comprising a Packet Order Enforce (POE) module and a plurality of cores in a multi-core processor, wherein,
the POE module comprises:
a storing unit, configured to store received packets in a same stream sequentially;
a Get_packet command receiving unit, configured to receive Get_packet commands sent by the cores;
a distributing unit, configured to select among the stored packets, according to a preset scheduling rule, packets for processing by the cores, wherein the distributing unit comprises:
a selecting subunit, configured to, according to QoS information, perform Strict Priority (SP) scheduling or Weighted Round Robin (WRR) scheduling to select a Quality of Service (QoS) information queue, and
a determining subunit, configured to determine, according to a group identifier mask register of a particular core, a group queue that can be processed by the particular core, and select a packet for the particular core from the group queue;
a switching command receiving unit, configured to receive tag switching commands sent by the cores, wherein each tag switching command indicates that a particular core has finished a current processing stage;
a tag switching unit, configured to perform tag switching for each packet for which a current processing stage has been finished by a corresponding current core, in First In First Out (FIFO) order of the stored packets, to switch the packet to a subsequent processing stage performed by a subsequent core; and
a processing unit, configured to allocate the processed packets for which a current processing stage has finished to subsequent cores according to the Get_packet commands sent by the subsequent cores after completion of the tag switching, so that the packet processing continues until all processing stages are finished;

wherein the tag switching unit comprises:
a storing subunit, configured to store packets into a bind First In First Out (FIFO) queue in FIFO order; and
a transferring subunit, configured to transfer the packets in the bind FIFO queue from a current group queue to a new group queue, and update tags of the packets;
and
each of the cores comprises:
a Get_packet command sending unit, configured to send a Get_packet command to the POE module;
a packet processing unit, configured to obtain a packet from a packet buffer address returned by the POE module and process the packet;
a switching command sending unit, configured to send a tag switching command to the POE module to indicate that the core has finished the current processing stage of the packet; and
a service executing unit, configured to execute other service procedures while the POE module performs the tag switching after the switching command sending unit sends the tag switching command.

* * * * *